United States Patent [19]
Aoki et al.

[11] Patent Number: 5,813,691
[45] Date of Patent: Sep. 29, 1998

[54] TWIST BEAM TYPE SUSPENSION HAVING A RIGID TWIST BEAM

[75] Inventors: Tetsuya Aoki, Düsseldorf, Germany; Yoji Uchida; Mamoru Sakamoto, both of Toyota, Japan; Toshiyasu Santo, Aichi-Ken, Japan; Tatsuzo Komiya, Okazaki, Japan; Masaharu Ohba, Aichi-Ken, Japan

[73] Assignee: Toyota Jidosha Kabushiki Kaisha, Toyota, Japan

[21] Appl. No.: 616,495

[22] Filed: Mar. 19, 1996

[30] Foreign Application Priority Data

Mar. 24, 1995 [JP] Japan .................................. 7-065952
Oct. 12, 1995 [JP] Japan .................................. 7-264301

[51] Int. Cl.⁶ .................................................. B60G 21/05
[52] U.S. Cl. ........................... 280/689; 280/723; 280/725
[58] Field of Search .................................. 280/688, 721, 280/723, 725, 724, 689; 301/127

[56] References Cited

U.S. PATENT DOCUMENTS

| | | |
|---|---|---|
| 4,232,881 | 11/1980 | Kolbel et al. ........................... 280/721 |
| 4,486,030 | 12/1984 | Takata et al. ........................... 280/723 |

FOREIGN PATENT DOCUMENTS

| | | |
|---|---|---|
| 2-645-802 | 10/1990 | France . |
| 24 25 740 | 12/1975 | Germany ............................... 280/721 |
| 24 56 425 | 8/1976 | Germany ............................... 280/721 |
| 36-12-777-A1 | 10/1987 | Germany . |
| A-4-283114 | 10/1992 | Japan . |

*Primary Examiner*—Peter C. English
*Attorney, Agent, or Firm*—Oliff & Berridge PLC

[57] ABSTRACT

A twist beam type suspension has a twist beam having an increased rigidity. Each of a pair of trailing arms has a front end pivotally mounted on a body of the vehicle and a rear end rotatably supporting a wheel. A twist beam extends between the trailing arms in a side-to-side direction of the vehicle. Opposite ends of the twist beam are connected to the respective trailing arms. The twist beam has a bent portion projecting upwardly in the center of the twist beam.

15 Claims, 6 Drawing Sheets

TWIST BEAM TYPE SUSPENSION HAVING A RIGID TWIST BEAM

BACKGROUND OF THE INVENTION

1. Field of the Invention

The present invention generally relates to suspensions used for a vehicle and the like and, more particularly, to a twist beam type suspension having a twist beam provided between left and right trailing arms.

2. Description of the Related Art

A twist beam type suspension is known which has a twist beam bridging between left and right trailing arms. The left and right trailing arms are pivotally supported on a vehicle body at their front ends. The twisted beam is formed substantially in a straight shape and connected at opposite ends to the respective left and right trailing arms.

The twist beam type suspension is generally classified into three types with respect to a position of the shear center axis of the twist beam relative to a bushing at a front end and an axle center of a wheel (a wheel supporting portion) of the trailing arm. The three types of the twist beam type suspension includes so-called front end type, middle type and rear end type. In the front end type, the shear center axis of the twist beam is positioned close to the bushing (front end) of the trailing arm. In the middle type, the shear center axis of the twist beam is positioned in the middle of the trailing arm between the bushing and the axle center thereof. In the rear end type, the shear center axis of the twist beam is positioned close to the axle center (rear end) of the trailing arm. The twist beam type suspensions of the front end type and the rear end type exhibit substantially the same behavior as a full trailing arm type suspension when the left and right wheels are moved in the same direction as well as moved in opposite directions. The twist beam type suspension of the middle type exhibits substantially the same behavior as a rigid axle suspension when the left and right wheels are moved in the same direction as well as moved in opposite directions. In such a twist beam suspension of those types, the twist beam straightly extends in the side-to-side direction of a vehicle. Accordingly, there may be a problem in that the twist beam interferes with other members such as a propeller shaft when the twist beam type suspension is applied to a 4-wheel drive vehicle or a front engine rear drive vehicle. Especially, such an interference is serious in the twist beam type suspension of the above-mentioned front end type and middle type.

Additionally, in the twist beam type suspension, a motion of bouncing and rebouncing of each wheel has a virtual swing axis. The virtual swing axis is defined as a line between the pivot point at the front end of the trailing arm and an intersection of the shear center axis of the twist beam and a center vertical plane of the vehicle body. If the twist beam is bent so that the center thereof is higher than the opposite ends thereof so as to avoid an interference with a propeller shaft, the shear center axis is also shifted upwardly. This causes the virtual swing axis of wheel being inclined downwardly with respect to the horizontal direction when viewed in the outboard direction. This results in a variation in a suspension alignment change characteristic when the wheel is bounced and rebouced.

Japanese Laid-Open Patent Application No.4-283114 discloses a twist beam type suspension which eliminates the above-mentioned problem. That is, this twist beam type suspension avoids an interference between the twist beam and the propeller shaft without change in the suspension alignment change characteristics.

Figure 1:
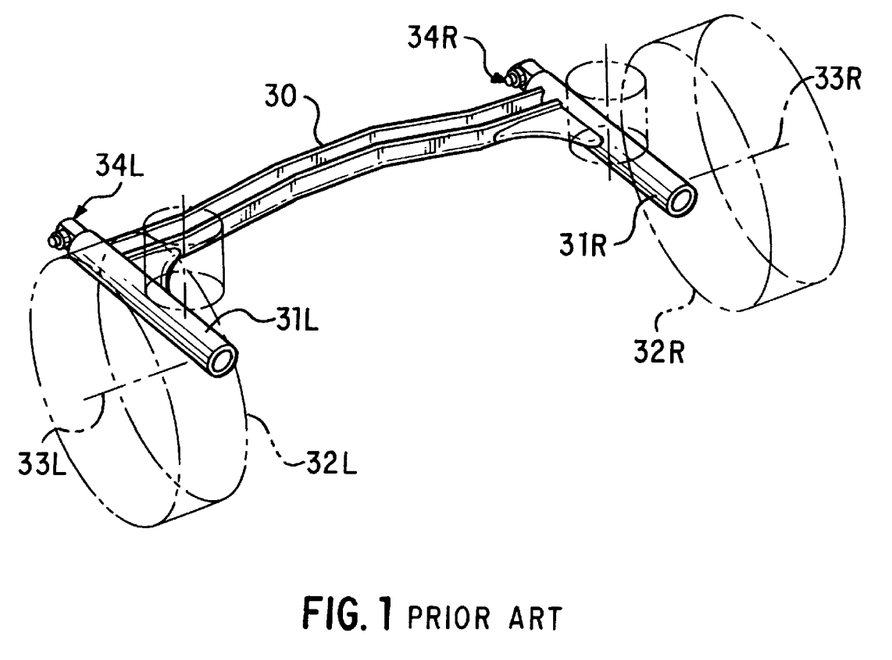
FIG. 1 is a perspective view of a conventional twist beam type suspension.

FIG. 1 is a perspective view of the twist beam type suspension disclosed in the Japanese Laid-Open Patent Application No. 4-283114. This twist beam type suspension comprises a pair of trailing arms 31L and 31 R and a twist beam 30 connected between the trailing arms 31L and 31R. Joints 34L and 34R, which pivotally support the respective trailing arms 31L and 33R, are provided on front ends of the respective trailing arms 31L and 31R. Wheels 32L and 32R are rotated about respective wheel axles 33L and 33R. The opposite ends of the twist beam 30 are connected to the trailing arms 31L and 31R, respectively, in the middle of the front end and the rear end of each of the trailing arms 31L and 31R. The twist beam has a channel shaped cross section opening upwardly. The center portion of the twist beam 30 is bent upwardly so as to form a space under the center portion through which space a propeller shaft may be extended.

Figure 2:
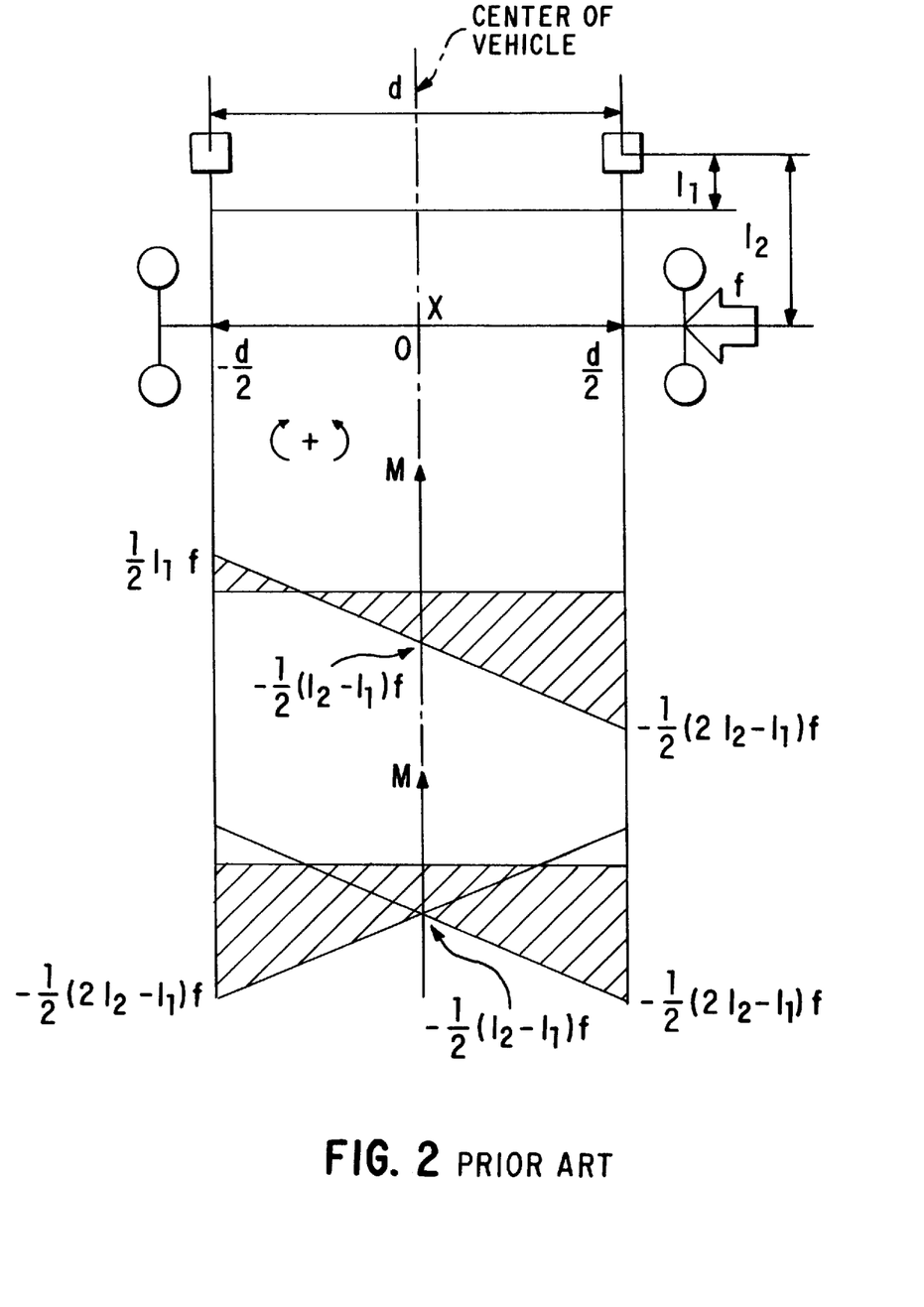
FIG. 2 is an illustration for explaining a bending moment generated in the twist beam when a side force is generated in a vehicle having the twist beam type suspension shown in FIG. 1.

When a vehicle turns, a side force exerted on the outer wheel is considerably greater than a side force exerted on the inner wheel. FIG. 2 is an illustration for explaining a bending moment generated in the twist beam 30 when a side force f is generated in a vehicle having the twist beam type suspension shown in FIG. 1. In FIG. 2, the side force f is exerted on the right wheel. FIG. 2 diagrammatically illustrates the left and right wheels 32L and 32R and the left and right joints 34L and 34R. The side force f is exerted on the right wheel 32R. FIG. 2 shows a bending moment diagram of the twist beam 30.

The bending moment M at the opposite side ends and the center thereof are represented as follows, where d is a distance between the left and right joints 34L and 34R, respectively $l_1$, is a distance between the twist beam 30 and the joints 34R and 34L; $l_2$ is a distance between the wheels 32L and 32R and the respective joints 34L and 34R. The axis x corresponds to the longitudinal direction of the twist beam 30.

$$x = -d/2 \qquad M = (l_1/2)^*f$$
$$X = 0 \qquad M = -(1/2)^*(l_2 - l_1)^*f$$
$$X = d/2 \qquad M = -(1/2)^*(2l_2 - l_1)^*f$$

Since the side force is also exerted on the left wheel when the vehicle turns in the opposite direction, the distribution of the maximum bending moment generated in the side beam 30 becomes as shown in FIG. 2.

$$x = -d/2 \qquad M = -(1/2)^*(2l_2 - l_1)^*f$$
$$X = 0 \qquad M = -(1/2)^*(l_2 - l_1)^*f$$
$$X = d/2 \qquad M = -(1/2)^*(2l_2 - l_1)^*f$$

If a steering angle shifts toward the oversteer side due to a side force exerted on a wheel, it undesirably influences stability and controllability of vehicle operation. Thus, the twist beam must have a rigidity against the bending moment shown in FIG. 2.

Figure 3:
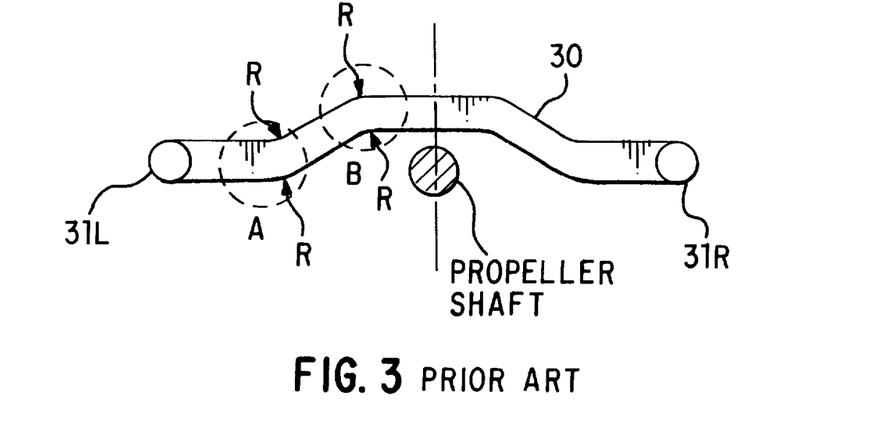
FIG. 3 is a contour of the twist beam 30, viewed from the rear side.

FIG. 3 is a contour of the twist beam 30 viewed from the rear side. In order to raise the center portion, the twist beam 30 is bent at portions indicated by dotted circles A and B. That is, as shown in FIG. 3, the twist beam 30 is bent with a relatively small radius of curvature R at the portions A and B.

Generally, if there is a bent portion in the twist beam, rigidity is reduced at the bent portion even though the cross section is uniform at the bent portion. In the twist beam 30 having the contour shown in FIG. 3, the bent portions, that is, the portions A and B, are located at positions apart from the center of the twist beam 30. That is, the bent portions A and B are located in an area where the bending moment is relatively greater than the bending moment in the center of the twist beam 30. Accordingly, the twist beam type suspension shown in FIG. 3 has a disadvantage in that the rigidity is reduced at the bent portions A and B. Thus, a variation in the steering angle on the oversteer side against a side force is increased. This is a disadvantage in view of the stability and controllability of vehicle operation.

SUMMARY OF THE INVENTION

It is a general object of the present invention to provide an improved and useful twist beam type suspension in which the above-mentioned problems are eliminated.

A more specific object of the present invention is to provide a twist beam type suspension having an increased rigidity so as to reduce the variation in the steering angle on the oversteer side.

In order to achieve the above-mentioned object, there is provided according to one aspect of the present invention a twist beam type suspension of a vehicle, comprising:

a pair of trailing arms each of which has a front end pivotally mounted on a body of the vehicle and a rear end rotatably supporting a wheel; and a twist beam extending between the trailing arms in a side-to-side direction of the vehicle, opposite ends of the twist beam being connected to respective ones of the pair of trailing arms, the twist beam having a bent portion projecting upwardly at a center of the twist beam.

According to the above-mentioned invention, the bent portion is provided at the center of the twist beam at which center a bending moment generated in the twist beam is a minimum. Accordingly, the rigidity of the twist beam is substantially increased as compared to the conventional suspension having a twist beam having a bent portion at a position remote from the center of the twist beam.

In one embodiment, a radius of curvature of the bent portion is minimum at the center of the twist beam and increases toward the opposite ends thereof. Accordingly, the twist beam has the minimum radius of curvature at the center of the twist beam at which a bending moment generated in the twist beam is minimum. That is, the bent portion is located in a position where the bending moment is decreased. Thus, the rigidity of the twist beam is substantially increased.

The cross section of the twist beam may be open toward one side. The twist beam type suspension according to the present invention may further comprise a gusset reinforcing a connection of the twist beam and each of the trailing arms, the gusset being provided on a closed side of the twist beam. Each of the trailing arms may have a straight portion and the gusset may be welded to the straight portion and the closed side of the twist beam. The gusset may have a cross section having generally a U-shape.

Preferably, the cross section of the twist beam may be open toward one of a front end and the rear end of the vehicle, and the gusset has an end extending along the twist beam, a top of the end of the gusset being offset downwardly from a center line of the twist beam when viewed from a rear end of the vehicle. Additionally, in the twist beam type suspension according to the present invention, the twist beam may be located adjacent to and behind a cross member provided in the body of the vehicle when viewed from a side of said vehicle, the cross member extending in the side-to-side direction of the vehicle.

Additionally, there is provided according to another aspect of the present invention a twist beam type suspension of a vehicle, comprising:

a pair of trailing arms each of which has a front end pivotally mounted on a body of the vehicle and a rear end rotatably supporting a wheel;

a twist beam extending between the trailing arms in a side-to-side direction of the vehicle, opposite ends of the twist beam being connected to respective ones of the pair of trailing arms, the twist beam comprising a bent portion and straight portions respectively extending from each end of the bent portion so that the straight portions are respectively connected to the trailing arms, the bent portion being projected upwardly in a center of the twist beam; and a gusset reinforcing a connection of the twist beam and one of the trailing arms by being welded to the straight portion of the twist beam and the one of the trailing arms.

According to this invention, the bent portion is provided at the center of the twist beam at which center a bending moment generated in the twist beam is minimum. Accordingly, the rigidity of the twist beam is substantially increased as compared to the conventional suspension having a twist beam having a bent portion at a position remote from the center of the twist beam. Additionally, the connection of the twist beam and each of the trailing arms is reinforced by the gusset which is easily welded to the straight portion of the twist beam with a high quality weld. Thus, the rigidity of entire construction of the twist beam type suspension according to this invention can be increased.

Other objects, features and advantages of the present invention will become more apparent from the following detailed description when read in conjunction with the accompanying drawings.

DETAILED DESCRIPTION OF THE PREFERRED EMBODIMENTS

A description will now be given of a first embodiment of the present invention.

Figure 4:
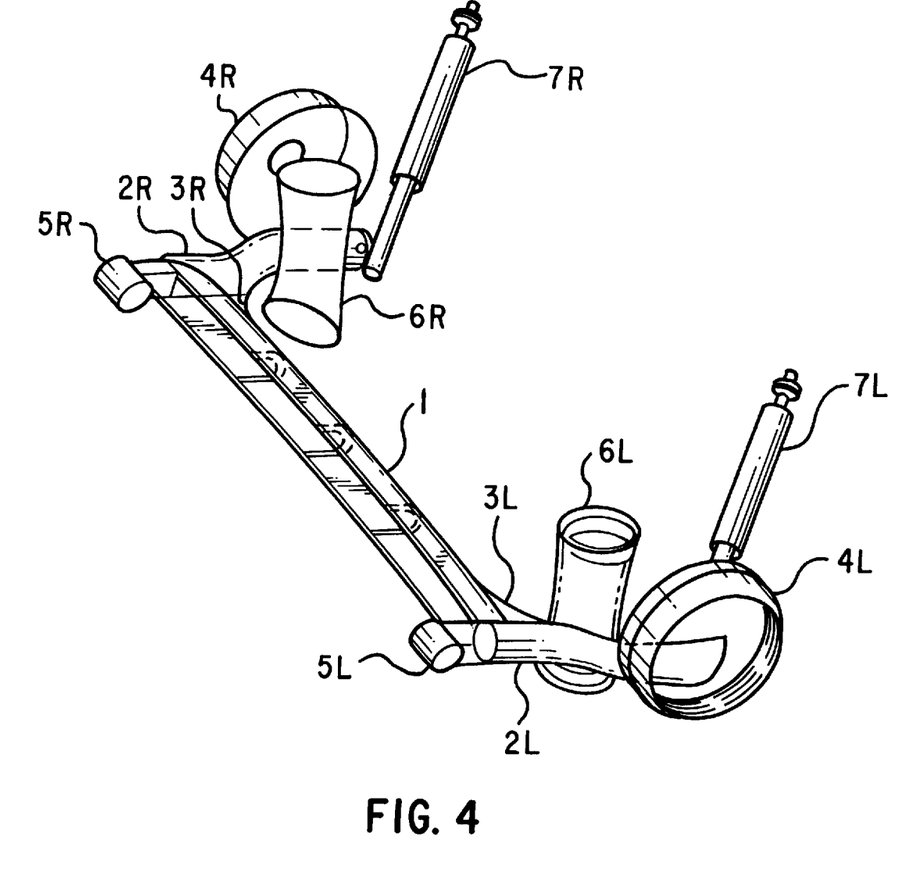
FIG. 4 is a perspective view of a twist beam type suspension according to a first embodiment of the present invention.

Referring to FIG. 4, the twist beam type suspension according to the first embodiment comprises a twist beam 1, a pair of left and right trailing arms 2L and 2R and gussets 3L and 3R. The twist arm 1 extends between the trailing arms 2L and 2R. The opposite ends of the twist beam 1 are connected to the respective trailing arms 2L and 2R. The gussets 3L and 3R are provided to reinforce the connection between the twist beam 1 and each of the trailing arms 2L and 2R.

Figure 5A:
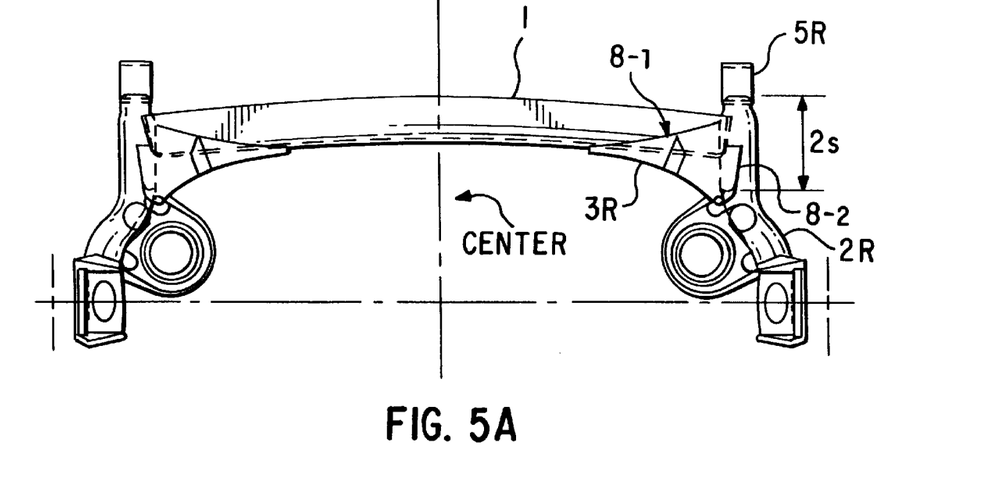
FIG. 5A is a plan view of the twist beam type suspension shown in FIG. 4.
Figure 5B:
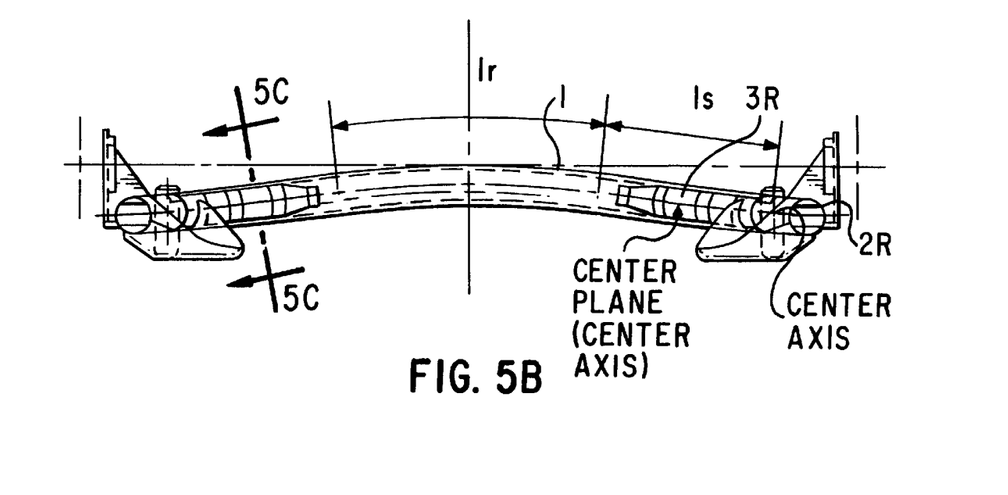
FIG. 5B is a side view of the twist beam type suspension shown in FIG. 5A, viewed from the rear side of the vehicle.

Each of the left and right trailing arms 2L and 2R has a straight portion 2s on the front end thereof as clearly shown in FIG. 5A. The trailing arms 2L and 2R are pivotally supported at their front ends on a vehicle body (not shown) via joints 5L and 5R, respectively. Each of the joints 5L and 5R includes a rubber bushing. The trailing arms 2L and 2R are connected to the vehicle body through respective linkages (not shown). Wheels 4L and 4R are rotatably supported at the rear ends of the respective trailing arms 2L and 2R. Additionally, compression springs 6L and 6R, which act as suspension springs interposed between the vehicle body and the trailing arms 2R and 2L, are attached to the respective trailing arms 2L and 2R. Further, shock absorbers 7L and 7R are connected to the rear ends of the respective trailing arms 2L and 2R.

The twist beam 1 is connected to the trailing arms 2L and 2R. The connections between the twist beam 1 and each of the trailing arms 2L and 2R are reinforced by the respective gussets 3L and 3R. The gusset 3R on the right side is welded to the twist beam 1 and the right trailing arm 2R along weld lines 8-1 and 8-2 as shown in FIG. 5A. The gusset 3L on the left side is also welded to the twist beam 1 and the left trailing arm 2L in the same manner.

Figure 5C:
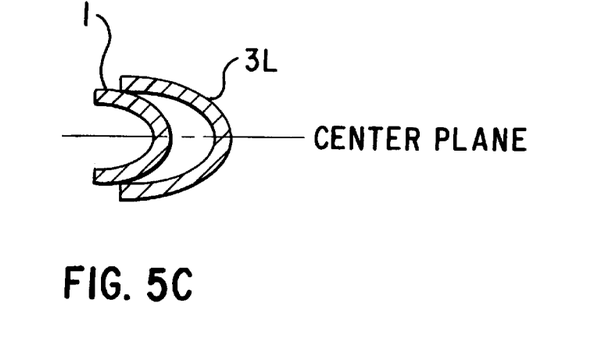
FIG.5C is a cross-sectional view taken along a line 5C—5C in FIG. 5B.

The twist beam 1 has a cross section having a U-shape opening forwardly as shown in FIG. 5C. The twist beam has a bowed portion 1r in the center thereof to raise the center portion from the level of the trailing arms 2L and 2R so that the twist beam 1 does not interfere with a propeller shaft (not shown) extending under the center portion of the twist beam 1. The bowed center portion 1r connects to straight portions 1s at opposite ends thereof. The straight portions extend substantially straight to the respective trailing arms 2L and 2R. The radius of curvature of the bowed center portion 1r is minimum at the center of the twist beam 1 (the center of the vehicle body) and increased toward each end so that the center portion 1r smoothly connects to the straight portions 1s.

In the present embodiment, since only a single bent portion (the bowed center portion) is provided in the twist beam 1, the radius of curvature of the twist beam 1 is much greater than the radius of curvature of the bent portions of the conventional twist beam shown in FIG. 1. As previously discussed with reference to FIG. 2, the bending moment of the twist beam 1 is minimum at the center thereof. Since the radius of curvature of the twist beam 1 is minimum at the center of the twist beam 1 at which center the bending moment is minimum, the rigidity of the twist beam 1 is substantially increased.

As mentioned above, the gussets 3L and 3R are welded on the opposite ends of the twist beam 1 and the respective trailing arms 2L and 2R to reinforce the connections therebetween and to increase the rigidity of the connecting portions. In the construction of the present embodiment, the gussets 3L and 3R are welded to the straight portions 1s and the straight portions of the respective trailing arms 2L and 2R. Thus, a welding of the gussets 3L and 3R can be easily performed and a higher welding quality can be achieved as compared to a welding performed along a curved line. The higher welding quality results in improvement in durability of the twist beam 1 since the rigidity in the connections between the twist beam 1 and the trailing arms 2L and 2R is increased, even though the connections are subjected to the maximum bending moment as previously discussed.

Additionally, in the present invention, the connecting portions between the twist beam 1 and each of the trailing arms 2L and 2r are such that the center of each of the trailing arms 2L and 2R lies in the center plane of the twist beam 1. Accordingly, the assembly of the twist beam 1, the trailing arms 2L and 2R and the gussets 3L and 3R becomes symmetrical with respect to the center plane of the twist beam 1. As a result, the gussets 3L and 3R provided on the left side and the right side are common in their shapes. Thus, the number of parts comprising the twist beam type suspension according to the present embodiment can be reduced.

As mentioned above the straight portions 1s are provided to improve the rigidity and weldability and to reduce the number of parts. However, the bowed center portion may be extended to the trailing arms 2R and 2L with a radius of curvature gradually increasing toward their ends without straight portions.

In the above-mentioned embodiment, the twist beam 1 is mounted to the trailing arms 2L and 2R so that the cross section of the twist beam 1 has generally a U-shape opening toward the front end of the vehicle. However, the twist beam may be positioned so that the cross section thereof opens in any direction. That is, the cross section of the twist beam 1 may be open toward the rear end of the vehicle. In such a case, the gussets 3L and 3R may be mounted on a back side which is a closed side of the twist beam 1.

Figure 6:
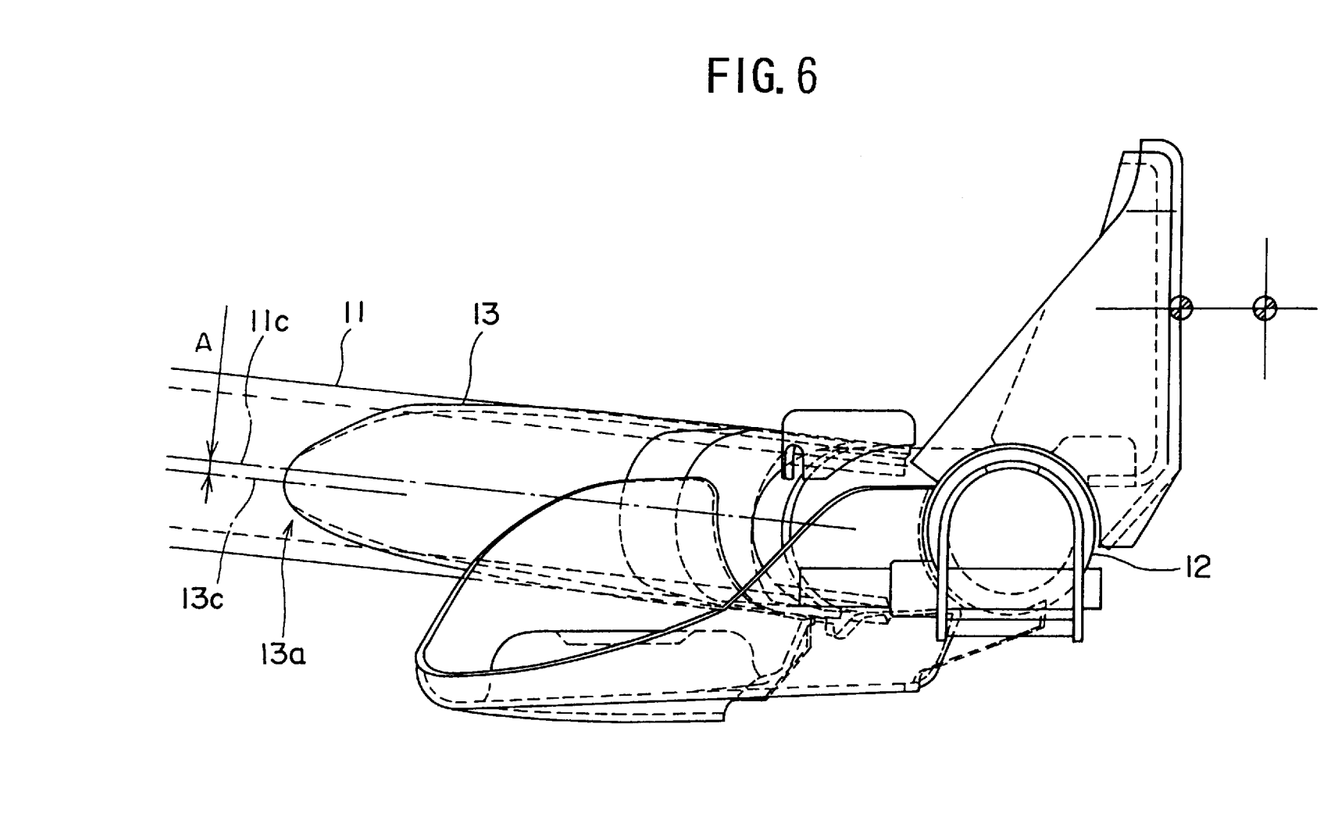
FIG. 6 is a rear view of a part of a twist beam type suspension according to a second embodiment of the present invention.

A description will now be given of a second embodiment of the present invention. FIG. 6 is a rear view of a part of a twist beam type suspension according to the second embodiment of the present invention. The twist beam type suspension according to the second embodiment has the same construction as the suspension according to the first embodiment shown in FIG. 4 except for the mounting construction of the gusset 3L and 3R acting as reinforcing members between the twist beam 1 and the trailing arms 2L and 2R.

In FIG. 6, a gusset 13 is fixed by welding in a portion between a twist beam 11 and a right trailing arm 12. An end 13a of the gusset 13 connected to the twist beam 11 is reduced in its width which is measured in the vertical direction of the vehicle. The gusset 13 is welded to the twist beam 11 along an edge of the end 13a. The gusset 13 is welded so that the center line 13c of the end 13a is offset downwardly by a distance A from the center line 11c of the twist beam 11. That is, a tip of the end 13a is offset downwardly from the center line of the twist beam 11 when viewed from the rear of the vehicle.

In the twist beam type suspension having the above-mentioned construction, a side force generated when the vehicle turns is received by the joints 5L and 5R of the trailing arms. Since the side force is actually applied on the ground contacting point of the wheels 4L and 4R, it is preferable to locate the linking parts such as the twist beam 11 and the trailing arm 12 in a plane including the ground contacting points and the left and right joints 5L and 5R. A stress generated is reduced as the linking parts are located closer to this plane.

However, due to a restriction in the manufacturing, the linking parts must be located above that plane. In the embodiment shown in FIG. 6, the end 13a of the gusset 13 is closer to that plane as compared to the construction where the center of the gusset corresponds to the center of the twist beam 11. In this case, the position of the center of the end 13a is carefully determined so as not to influence the suspension characteristics. If the center of the end 13a is excessively offset from the center of the twist beam 11, the shear center axis of the twist beam 11 may be considerably changed which condition badly influences the characteristic of the suspension.

In the present embodiment, since the center line of end 13a of the gusset 13 is offset from the center line of the twist beam 11 so that the center line of the gusset 13 is closer to the plane including the ground contacting points of the wheels 4L and 4R and the left and right joints 5L and 5R. Thus, the stress generated in the vicinity of the connecting portion of the gusset 13 and the twist beam 11 is reduced. This results in an improvement in durability of the suspension.

Figure 7A:
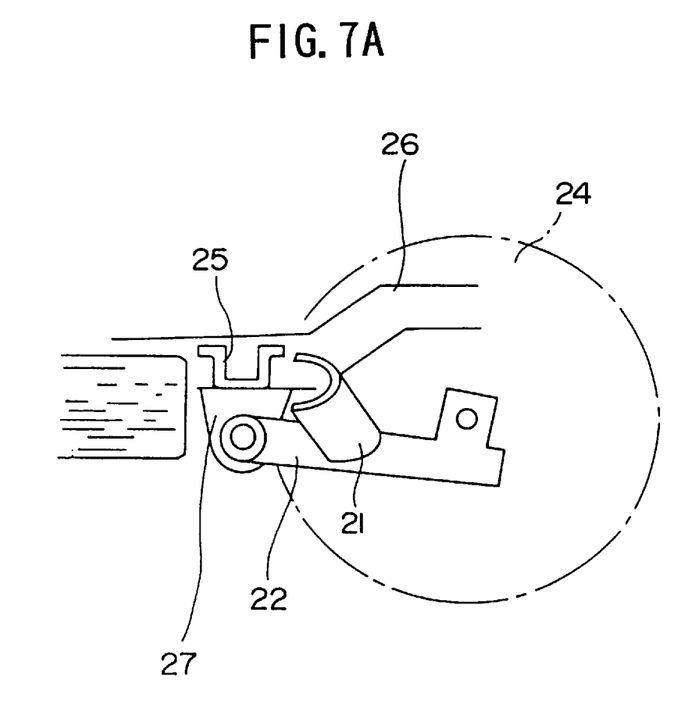
FIG. 7A is an illustration of a part of a twist beam type suspension similar to that shown in FIG. 4 or FIG. 6.
Figure 7B:
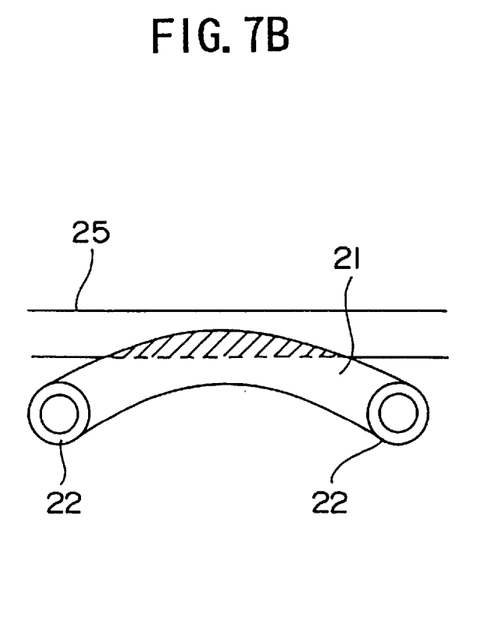
FIG. 7B is an illustration for explaining a positional relationship between a twist beam and a cross member shown in FIG. 7A.

FIG. 7A is an illustration of a part of a twist beam type suspension similar to that shown in FIG. 4 or FIG. 6, viewed from the center between left and right wheels. FIG. 7B is an illustration for explaining a positional relationship between a twist beam and a cross member shown in FIG. 7A.

In FIG. 7A, a twist beam 21 (only a half portion is shown) is connected to a right trailing arm 22. The front end of the trailing arm 22 is pivotally connected to an arm bracket 27 mounted on a right side member 26. A right wheel 24 is rotatably supported by the rear end of the trailing arm 22. The twist beam 21 is connected to the trailing arm 22 at a middle position between the front end and the rear end of the trailing arm 22. A cross member 25 extends between the right side member 26 and a left side member (not shown in the figure) so that the cross member 25 is located in front of the twist beam 21. The center of the twist beam 11 raised from its ends is almost at the same level of the cross member 25 as shown in FIG. 7B.

By arranging the cross member 25 and the twist beam 27 in the positions shown in FIGS. 7A and 7B, the twist beam 21 is protected from being hit by a flying object such as a pebble popped from the ground. Thus, a possibility of the twist beam 27 being damaged by a flying object is decreased, resulting in an increase in the durability of the suspension.

It should be noted that, in the above-mentioned second embodiment, the twist beam 21 is mounted to the side members so that the cross section of the twist beam 21 has generally a U-shape opening toward the front end of the vehicle. However, the twist beam 21 may be positioned so that the cross section thereof opens in any direction. That is, the cross section of the twist beam 21 may be open toward the rear end of the vehicle. In such a case, the gussets may be mounted on a back side which is a closed side of the twist beam 21.

The present invention is not limited to the specifically disclosed embodiments, and variations and modifications may be made without departing from the scope of the present invention.

What is claimed is:

1. A twist beam suspension of a vehicle, comprising:
    a pair of trailing arms each of which has a front end pivotally mounted on a body of said vehicle and a rear end rotatably supporting a wheel; and
    a twist beam extending between said trailing arms in a side-to-side direction of said vehicle, opposite ends of said twist beam being connected to respective ones of the pair of trailing arms, said twist beam having a bent portion connecting to straight portions at opposite ends of said bent portion, said bent portion being defined by a single smooth curve projecting upwardly, a radius of curvature of said bent portion being minimum at a center of said twist beam.

2. The twist beam suspension as claimed in claim 1, wherein said radius of curvature of said bent portion increases toward said opposite ends thereof.

3. The twist beam suspension as claimed in claim 1, wherein a cross section of said twist beam is open toward one side.

4. The twist beam suspension as claimed in claim 3, further comprising at least a pair of gussets, each gusset of said pair of gussets reinforcing a connection of said twist beam at one of said trailing arms, said pair of gussets being provided on a closed side of said twist beam.

5. The twist beam suspension as claimed in claim 4, wherein each of said trailing arms has a straight portion and each gusset of said pair of gussets is welded to said straight portion of said trailing arms and said closed side of said twist beam.

6. The twist beam suspension as claimed in claim 5, wherein each gusset of said pair of gussets has a cross section having generally a U-shape.

7. The twist beam suspension as claimed in claim 4, wherein said cross section of said twist beam is open toward one of a front end and a rear end of said vehicle, and each gusset of said pair of gussets has an end extending along said twist beam, a tip of said end being offset downwardly from a center line of said twist beam when viewed from a rear end of said vehicle.

8. The twist beam suspension as claimed in claim 1, wherein said twist beam is located adjacent to and behind a cross member provided in the body of said vehicle when viewed from a side of said vehicle, said cross member extending in the side-to-side direction of said vehicle.

9. A twist beam suspension of a vehicle, comprising:
    a pair of trailing arms each of which has a front end pivotally mounted on a body of said vehicle and a rear end rotatably supporting a wheel;
    a twist beam extending between said trailing arms in a side-to-side direction of said vehicle, opposite ends of said twist beam being connected to respective ones of the pair of trailing arms, said twist beam comprising a bent portion and straight portions respectively extending from each end of said bent portion so that said straight portions are respectively connected to said trailing arms, said bent portion being defined by a single smooth curve projecting upwardly, a radius of curvature of said bent portion being minimum at a center of said twist beam; and
    a gusset reinforcing a connection of said twist beam and one of said trailing arms by being welded to one of said straight portions of said twist beam and said one of said trailing arms.

10. The twist beam suspension as claimed in claim 9, wherein said radius of curvature of said bent portions increases toward each end thereof so that said bent portion connects smoothly to each of said straight portions.

11. The twist beam suspension as claimed in claim 9, wherein a cross section of said twist beam is open on one side and said gusset is provided on a closed side of said twist beam.

12. The twist beam suspension as claimed in claim 11, further comprising an additional gusset, another trailing arm of said trailing arms has a straight portion and said additional gusset is welded to said straight portion of said another trailing arm and another of said straight portions of said twist beam on said closed side of said twist beam.

13. The twist beam suspension as claimed in claim 12, wherein said gusset and said additional gusset have a cross section having a generally U-shape.

14. The twist beam suspension as claimed in claim 9, wherein a cross section of said twist beam is open toward one of a front end and a rear end of said vehicle, and said gusset has an end extending along said twist beam, a tip of said end of said gusset being offset downwardly from a center line of said twist beam when viewed from the rear end of said vehicle.

15. The twist beam suspension as claimed in claim 9, wherein said twist beam is located adjacent to and behind a cross member provided in the body of said vehicle when viewed from a side of said vehicle, said cross member extending in the side-to-side direction of said vehicle.

* * * * *